United States Patent [19]

Reiner et al.

[11] Patent Number: 4,458,146
[45] Date of Patent: Jul. 3, 1984

[54] PHOTOELECTRIC MOVEMENT DETECTOR WITH VARYING AMPLITUDE LIGHT SOURCE

[75] Inventors: Robert Reiner, Neubiberg; Eckart Schatter, Zorneding, both of Fed. Rep. of Germany

[73] Assignee: Siemens Aktiengesellschaft, Berlin and Munich, Fed. Rep. of Germany

[21] Appl. No.: 259,820

[22] Filed: May 4, 1981

[30] Foreign Application Priority Data

May 9, 1980 [DE] Fed. Rep. of Germany ....... 3017862

[51] Int. Cl.³ .............................................. G01V 9/04
[52] U.S. Cl. .................................. 250/221; 250/222.1; 340/556
[58] Field of Search ...................... 250/221, 222, 206; 340/555, 556, 557, 659, 660, 661; 358/108

[56] References Cited

U.S. PATENT DOCUMENTS 3,309,688  3/1967  Yanishevsky .................. 340/659
3,946,241  3/1976  Malinowski .................... 250/221

FOREIGN PATENT DOCUMENTS 984481  2/1976  Canada ............................ 340/556

Primary Examiner—David C. Nelms
Attorney, Agent, or Firm—Herbert L. Lerner; Laurence A. Greenberg

[57] ABSTRACT

Device for determining movements with light, including a light transmitter for radiating light pulses with steeply rising and slowly falling flanks, and a light receiver for the light pulses radiated by the light transmitter, the light receiver including an evaluation threshold device for measuring the duration of individual light pulses, for storing the pulses and for comparing the pulses with each other.

9 Claims, 2 Drawing Figures

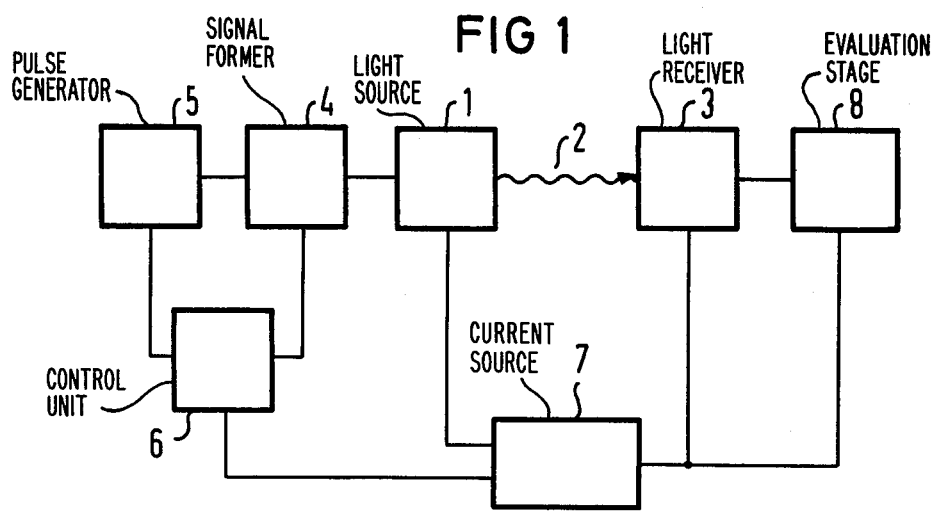
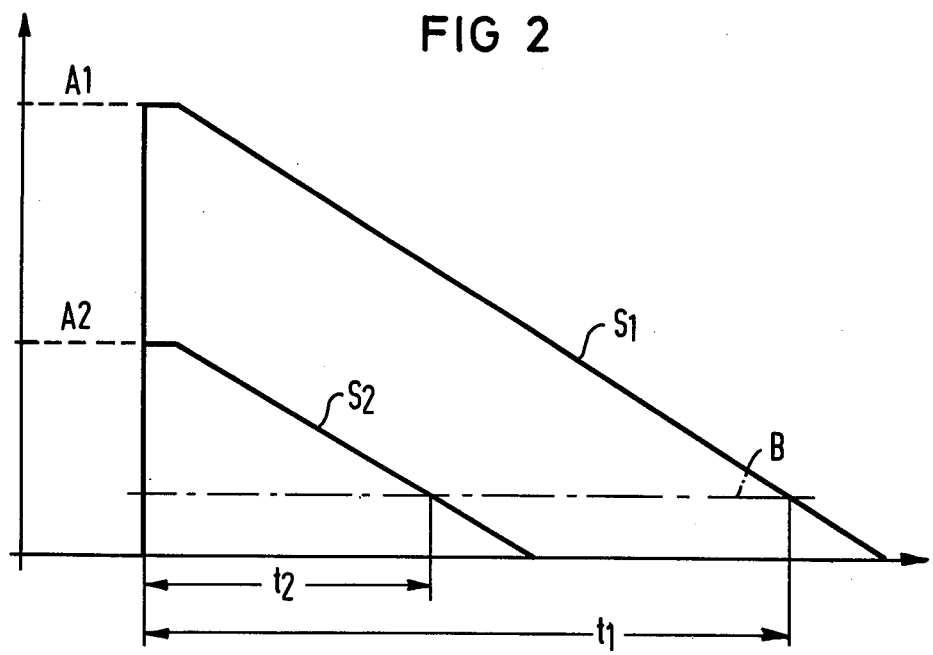

PHOTOELECTRIC MOVEMENT DETECTOR WITH VARYING AMPLITUDE LIGHT SOURCE

The invention relates to a device for determining movements or to a movement indicator through the use of light, especially infrared light, including a light transmitter radiating a light pulse and a light receiver for the light pulses radiated by the light transmitter.

Customary movement indicators for alarm systems, door openers and the like operate either in accordance with the Doppler principle with microwaves or ultrasound in particular, or as light gates. In the movement indicators operating according to the Doppler principle, the change in frequency of the reflected signals, caused by a movement of an object in the room under surveillance is evaluated. Light gates have a light transmitter and a light receiver for the light emitted by the light transmitter. A movement in the room under surveillance can be determined if the moving object enters into the transmission path between the light sender and the light receiver or leaves the latter.

In light gates which are equipped with semiconductor components for the light transmitter and the light receiver, the use of the Doppler principle is not possible since the light has only a limited transmission band width, which is due to the relatively narrow spectrum in which the light transmitter delivers light or in which the light receiver is sensitive. Movement indicators operating in accordance with the Doppler principle, however, have the advantage that even gradual changes in a room under surveillance can be determined, while light gates allow only a so-called yes or no statement.

It is accordingly an object of the invention to provide a device for determining movements, which overcomes the hereinafore-mentioned disadvantages of the heretofore-known devices of this general type, and which also permits the determination of gradual changes in a room under surveillance without the Doppler principle.

With the foregoing and other objects in view there is provided, in accordance with the invention, a device for determining movements with light, particularly infrared light, comprising a light transmitter for radiating light pulses with steeply rising and slowly falling slopes, and a light receiver for the light pulses radiated by the light transmitter, the light receiver including an evaluation threshold device for measuring the duration of individual light pulses, for storing the pulses and for comparing the pulses with each other.

In accordance with another feature of the invention, there is provided a light transmitter for radiating light pulses, and a light receiver for the light pulses radiated by the light transmitter, the light receiver including an evaluation threshold device having a variable evaluation threshold. In other words, the light receiver has an evaluation threshold device, the evaluation threshold of which can be slowly changed in comparison with the duration of the light pulses, in order to circumvent the noise which is caused by interfering light or heat sources.

In accordance with a further feature of the invention, at least one of the rising and falling slopes of the light pulses follows an exponential function and the other of the slopes follows a linear function.

In accordance with an added feature of the invention, the slopes of the light pulses follow an exponential or a linear function. In other words, the light pulses have exponentially or linearly rising and/or exponentially or linearly falling slopes.

In accordance with an additional feature of the invention, there are provided means for supplying a line voltage, the light pulses being radiated synchronously with the frequency of the line voltage.

In accordance with again another feature of the invention, the light pulses are modulated by being superimposed on a carrier signal, or a carrier signal can be superimposed on the light pulses.

In accordance with again a further feature of the invention, a code word is impressed on the light pulses.

Depending on the conditions on the transmission path, the pulse emitted by the light transmitter of the invention arrives at the light receiver with different amplitudes and is converted there by means of the evaluation threshold device into corresponding times which are measured digitally and can be stored. Digital processing of the times is substantially simpler as opposed to processing the amplitude.

Depending on a particular application, several such so-called ramp pulses are evaluated in the light receiver and compared with each other. Depending on the deviation of the times determined, it is decided whether or not changes have taken place in the room under surveillance.

Therefore, in accordance with again an added feature of the invention, the pulses radiated by the light transmitter have a given minimum duration, and the variable evaluation threshold is chargeable from a range with a given highest sensitivity to a range with insensitivity in a shorter time than the given minimum duration.

In accordance with a concomitant feature of the invention, the evaluation threshold is linearly or exponentially changeable.

Other features which are considered as characteristic for the invention are set forth in the appended claims.

Although the invention is illustrated and described herein as embodied in a device for determining movements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific ambodiments when read in connection with the accompanying drawings, in which:

FIG. 1 is a schematic block diagram of the device according to the invention; and FIG. 2 is a graph of the wave form of pulses in the invention.

Referring now to the figures of the drawing and first particularly to FIG. 1 thereof, it is seen that a light source 1 in the form of an infrared light-emitting diode sends light (indicated by an arrow 2) to a light receiver 3 in the form of a phototransistor sensitive to infrared light. A signal former 4 is connected in series with the light source 1. The signal former delivers electrical pulses with steeply rising and slowly falling slopes to the light source 1. These pulses are generated by the signal former 4 from pulses which are supplied by a pulse generator 5. These pulses delivered by the pulse generator 5 may, for instance, be squarewave pulses. The signal former 4 and the pulse generator 5 are further connected to a control unit 6, through which the signal former 4 and the pulse generator 5 can be triggered in the desired manner. A current source 7 serves for supplying the light source 1, the light receiver 3, the control unit 6, the signal former 4, the pulse generator 5 as well as an evaluation stage 8 following the light receiver 3.

According to the invention, the light source 1 radiates an infrared pulse which has a steeply rising and a slowly falling slope (as seen in FIG. 2) and is represented, for instance, by a signal S 1 in FIG. 2. This signal S 1 has an amplitude A 1. If there are no obstacles in the transmission path, this signal S 1 arrives unchanged at the light receiver 3. If, however, there are obstacles in the transmission path, the signal S 1 is attenuated and arrives as signal S 2 at the light receiver 3 with an amplitude A 2. The signals S 1 and S 2 are converted by means of an evaluation threshold B in the receiver 3 into corresponding times t 1 and t 2 between crossings of the threshold B and the signal, which are measured and stored digitally in the evaluation stage 8. The digital processing of the times t 1 and t 2 is relatively simple as compared to digital processing of the amplitude A.

The following operation is also possible with an inversion of the principle:

If the transmitter 1 emits a square wave pulse with a minimum duration $t_3$, the receiver 3 may shift an evaluation threshold instead of the signal. If this is done, starting with the highest sensitivity, in the direction toward less sensitivity linearly or exponentially, passing through the entire sensitivity range in time $< t_3$, the received amplitude is likewise converted into a time.

There are claimed:

1. Device for determining movements with light, comprising a light transmitter for radiating light pulses with steeply rising and gradually falling slopes, a light receiver for receiving said light pulses radiated by said light transmitter, said pulses being attenuated by objects which may be present between said light transmitter and receiver, said light receiver including an evaluation threshold device for digitally measuring the duration of individual light pulses above a given threshold, said duration measurements varying in proportion to the attenuation of said pulses, and an evaluation stage connected to said light receiver for storing said duration measurements and for comparing said duration measurements with each other.

2. Device according to claim 1, wherein one of said rising and falling slopes of said light pulses follows an exponential function and the other of said slopes follows a linear function.

3. Device according to claim 1, wherein said slopes of said light pulses follow an exponential function.

4. Device according to claim 1, wherein said slopes of said light pulses follow a linear function.

5. Device according to claim 1, including means for supplying a line voltage, said light pulses being radiated synchronously with the frequency of the line voltage.

6. Device according to claim 1, wherein said light pulses are modulated by being superimposed on a carrier signal.

7. Device according to claim 1, wherein said pulses radiated by said light transmitter have a given minimum duration, and said variable evaluation threshold is changeable from a range with a given highest sensitivity to a range with insensitivity in a shorter time than said given minimum duration.

8. Device according to claim 7, wherein said evaluation threshold is linearly changeable.

9. Device according to claim 7, wherein said evaluation threshold is exponentially changeable.

* * * * *